United States Patent [19]

El-Masri

[11] Patent Number: 4,753,068

[45] Date of Patent: Jun. 28, 1988

[54] GAS TURBINE CYCLE INCORPORATING SIMULTANEOUS, PARALLEL, DUAL-MODE HEAT RECOVERY

[76] Inventor: Maher A. El-Masri, 9 Clubhouse La., Wayland, Mass. 01778

[21] Appl. No.: 3,548

[22] Filed: Jan. 15, 1987

[51] Int. Cl.[4] .............................. F02C 7/00; F02C 7/10
[52] U.S. Cl. ................................ 60/39.511; 60/39.53; 60/39.59
[58] Field of Search ................. 60/39.53, 39.59, 39.55, 60/39.54, 39.56, 39.57, 39.58, 39.05, 39.511

[56] References Cited

U.S. PATENT DOCUMENTS

| | | | |
|---|---|---|---|
| 2,115,112 | 4/1938 | Lysholm | 60/42 |
| 2,115,338 | 4/1938 | Lysholm | 60/42 |
| 2,163,762 | 6/1939 | Noack et al. | 60/39.511 |
| 2,186,706 | 1/1940 | Martinka | 60/42 |
| 2,469,678 | 5/1949 | Wyman | 60/42 |
| 2,678,532 | 5/1954 | Miller | 60/39.53 |
| 2,869,324 | 1/1959 | Foote | 60/39.59 |
| 2,959,005 | 11/1960 | Zaba | 60/39.55 |
| 3,167,913 | 2/1965 | Mühlberg et al. | 60/39.53 |
| 3,238,719 | 3/1966 | Harslem | 60/39.55 |
| 3,657,879 | 4/1972 | Ewbank et al. | 60/39.05 |
| 3,693,347 | 9/1972 | Kydd et al. | 60/39.05 |
| 3,808,795 | 5/1974 | Lucas | 60/39.53 |
| 4,128,994 | 12/1978 | Cheng | 60/39.05 |
| 4,297,841 | 11/1981 | Cheng | 60/39.3 |
| 4,346,561 | 8/1982 | Kalina | 60/673 |
| 4,537,023 | 8/1985 | Nakamura et al. | 60/39.53 |

FOREIGN PATENT DOCUMENTS

717711  2/1942  Fed. Rep. of Germany.

OTHER PUBLICATIONS

Mori, Y. et al., "A Highly Efficient Regenerative Gas Turbine System by New Method of Heat Recovery with Water Injection", 83-Tokyo-IGTC-38.
El-Masri, M. A., "A Modified, High-Efficiency, Recuperated Gas-Turbine Cycle", ASME paper 87-GT-13, ASME GT conference, Anaheim, Jun. 1987, to appear in Journal of Engineering for Gas Turbines and Power.
Brown, D. H. et al., "An Evaluation of Steam Injected Combustion Turbine Systems" Journal of Engineering for Power, 103, pp. 13-19, 1981.
Jones, J. L. et al., "Operating Flexibility and Economic Benefits of a Dual Fluid Cycle 501KB Gas Turbine Engine In Cogeneration Applications", ASME 82-G-T-298.
Digumarthi, R. et al., "Cheng-Cycle Implementation on a Small Gas Turbine Engine", Journal of Engineering for Gas Turbines and Power, 106, pp. 609-702, 1984.
Leibowitz, H. et al., "The Integrated Approach to a Gas Turbine Topping Cycle Cogeneration System", Journal of Engineering for Gas Turbines and Power, 106, pp. 731-736, 1984.
Burnham, J. B. et al., "Development, Installation and Operating Results of a Steam Injection System (STIG) in a General Electric LM5000 Gas Generator", ASME 86-GT-231.
Larson, E. D. et al., "Steam-Injected Gas-Turbines", ASME 86-GT-47 Journal of Engineering for Gas Turbines and Power, in press.
Gasparovic, N. et al., "Gas Turbine With Heat Exchanger and Water Injection in the Compressed Air", The Institution of Mechanical Engineers, vol. 185 66/71, Proceedings 1970-71.

*Primary Examiner*—Louis J. Casaregola
*Assistant Examiner*—Donald E. Stout

[57] ABSTRACT

The cycle includes water-injection, steam-injection, recuperation (or regeneration) and waste-heat boiler heat recovery in an arrangement that provides high thermal efficiency, flexible operation in a cogeneration plant and favorable capital cost in relation to thermodynamic performance when compared to currently practiced cycles. In the present cycle, the sensible enthalpy of the exhaust gases between turbine exit and stack is used to simultaneously and in-parallel heat both air and water/steam. A smaller amount of water is boiled than in the known Cheng cycle, in which the exhaust heat is used only to heat water/steam. Thus, the latent heat exhausted at the stack in the present cycle is lower than that for the Cheng cycle resulting in higher efficiency.

20 Claims, 15 Drawing Sheets

GAS TURBINE CYCLE INCORPORATING SIMULTANEOUS, PARALLEL, DUAL-MODE HEAT RECOVERY

BACKGROUND OF THE INVENTION

This invention relates to an improved gas turbine power plant cycle and more particularly to a cycle wherein both the compressed motive fluid and water/steam are simultaneously and in-parallel heated by the exhaust gases between the turbine exit and stack.

In current practice, exhaust heat from a gas turbine power plant is recaptured for use in the heat-engine cycle by a single-mode device, i.e., one that heats compressor discharge air only such as a recuperator or regenerator; or one that heats water/steam only such as a waste heat boiler, with the steam utilized in the heat-engine either in a separate steam turbine (combined cycle) or by direct injection into the gas turbine combustor (Cheng cycle). The Cheng cycle is disclosed in U.S. Pat. No. 4,128,994. The present invention secures significant thermodynamic advantages by simultaneously recovering exhaust heat by both of the above modes in parallel and across a common exhaust gas temperature span. These thermodynamic advantages cannot be realized by the use of a boiler utilizing exhaust gases exiting from a recuperator, i.e., in a series arrangement, as currently practiced in some cogeneration applications. The advantages also cannot be fully realized solely by evaporative aftercooling followed by recuperation (e.g., Lysholm, U.S. Pat. No. 2,115,338) or by using staged evaporative water injection along recuperators without aftercooling (e.g., Foote, U.S. Pat. No. 2,869,324). Besides the superior thermodynamic performance over the latter two systems, the use of a separate boiler in the present invention also permits flexible integration into a cogeneration system.

It is therefore an object of the present invention to provide a novel configuration for the turbine exhaust heat recovery system in a gas turbine power plant cycle that provides high thermal efficiency.

Yet another object of the invention is a gas turbine power plant cycle resulting in flexible operation in a cogeneration plant having additional degrees of freedom for variable heat and power loads in cogeneration applications.

SUMMARY OF THE INVENTION

These and other objects and advantages of the invention are achieved in a gas turbine power plant cycle that includes water-injection, steam-injection, recuperation and waste-heat boiler heat recovery. All of the motive fluid entering the combustor in the present cycle has been heated. In particular, the exhaust gases are used to simultaneously and in-parallel heat both air and water/steam. In one embodiment, the compressor output is evaporatively cooled by water injection in an aftercooler. The motive fluid is then heated in a low temperature recuperator where it is heated to a temperature close to the saturation temperature at the gas-turbine combustor pressure. The motive fluid is then mixed with steam from a boiler and the mixture flows through a high temperature recuperator before being conveyed to the combustor. The exhaust gases are also used to heat water entering the aftercooler and boiler.

Other embodiments include intercooling between compressor stages. Yet another embodiment of the present invention includes a separate superheater for use in cogeneration applications where superheated steam is required. In all of these embodiments, a flow control device may be provided to apportion the flow of hot exhaust gases between two parallel paths in the heat recovery system.

BRIEF DESCRIPTION OF THE DRAWING

The invention disclosed herein will be understood better with reference to the drawing of which:

FIG. 2 is a Temperature-Entropy diagram illustrating the thermodynamic processes in the cycle of FIG. 1a;

FIGS. 6a and 6b are diagrams of the stack temperatures and "pinch-point" temperature differences for eight Cheng cycle examples and eight examples of the present cycle as given on the performance maps of FIG. 3a;

DESCRIPTION OF THE PREFERRED EMBODIMENTS

Figure 1A:
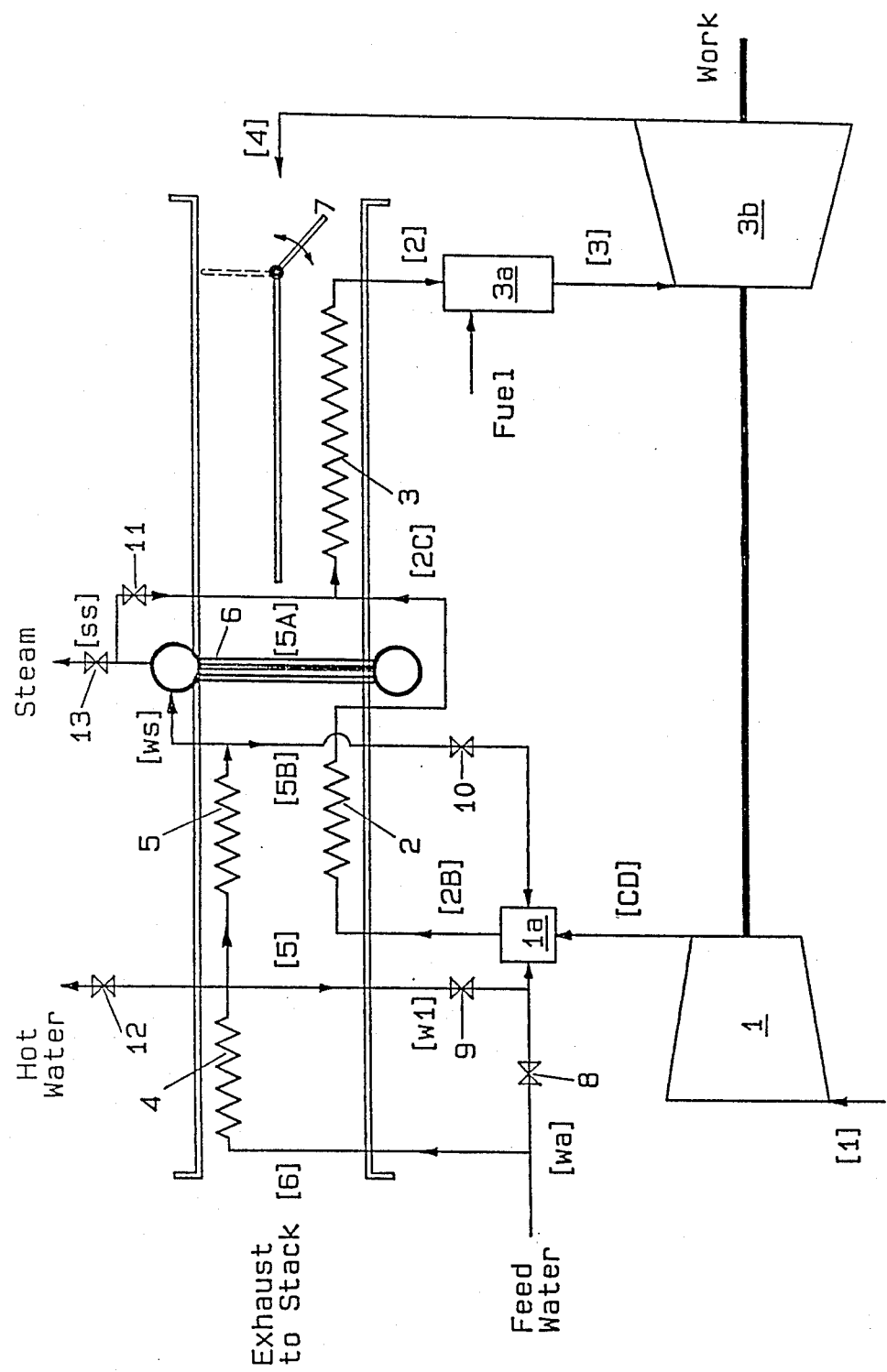
FIG. 1a is a schematic diagram of the cycle component layout and flow circuit according to the present invention.
Figure 2:
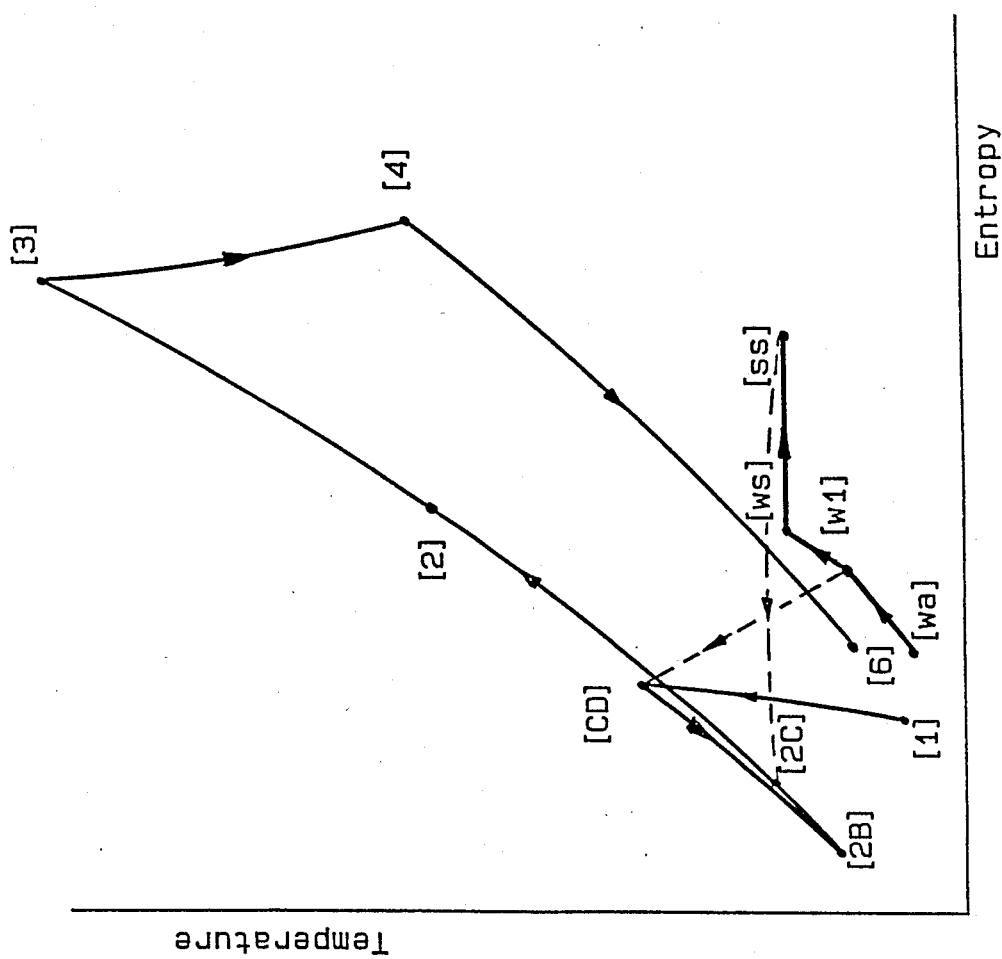

FIGS. 1a and 2 show the cycle processes of the present invention for the non-intercooled case. In the text square brackets are used to designate thermodynamic state points and numbers without brackets to designate component nomenclature as indicated on FIG. 1a. Motive fluid, typically ambient air, is compressed from state [1] to state [CD] in a compressor 1. The compressed air then enters aftercooler 1a where it is evaporatively cooled by water injection thereby reducing its temperature and increasing the mass flow rate of motive fluid, which exits the aftercooler at state [2B] and flows into a low-temperature recuperator (LTR) 2 where it is heated to a temperature close to the saturation temperature at the gas turbine combustor pressure, state [2C]. The motive fluid is then mixed with steam and the mixture flows through a high temperature recuperator (HTR) 3 where it is heated to state [2] before being conveyed to the combustor 3a. In most cases the combustor 3a will be a directly fired design as commonly used in gas turbine engines but could also be an indirectly fired heat exchanger. Heated motive fluid leaves the combustor at state [3] and enters a gas turbine 3b, where it is expanded to close-to-ambient pressure, state [4], thereby producing work to drive the compressor 1 and external load. The hot exhaust motive fluid as state [4] is then conveyed to the heat recovery system where it flows in counterflow heat exchange relationship against the cooler compressed motive fluid. A damper 7 (or other flow control device) is used to apportion the flow of hot exhaust gases between two parallel paths in the heat recovery system. For high work conversion efficiency, damper 7 is in the position shown by dotted lines and all the exhaust flows through HTR 3 where it is cooled down to state [5A]. The exhaust gases then pass through a boiler 6, raising steam while being simultaneously cooled down to state [5B]. They are then used to simultaneously heat in parallel the cool motive fluid through LTR 2 from state [2B] to state [2C] as well as water through a high temperature economiser (HTE) 5 from state [wl] to state [ws], the latter being essentially at saturation temperature corresponding to the boiler pressure. This simultaneous parallel heating may be accomplished in two physically separate heat exchange devices with the hot exhaust gas being apportioned between them by a flow control device, or in a single heat exchanger which includes parallel but separate flow paths for the cool motive fluid and boiler feedwater. The exhaust gases are thus cooled down to state [5] and then flow counter to the feedwater in a low temperature economiser (LTE) 4 where they are further cooled down to state [6] while heating the feedwater from state [wa] to state [wl]. They are then exhausted to the stack. Provision to partially condense the water vapor from the stack exhaust at state [6] in order to recycle the condensate may or may not be employed.

Figure 1B:
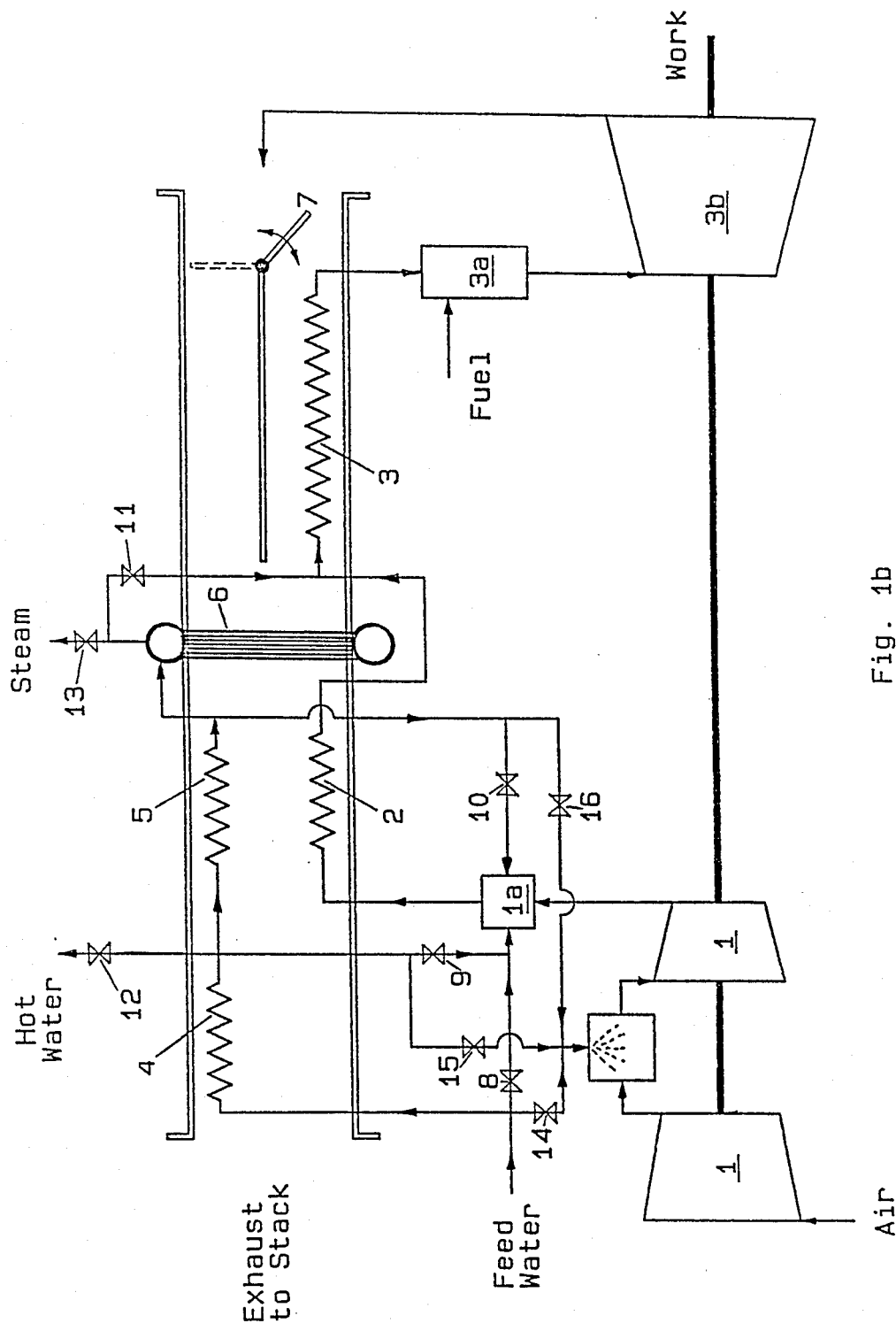
FIGS. 1b and 1c are schematic diagrams of the present invention including intercooling between compressor stages.
Figure 1C:
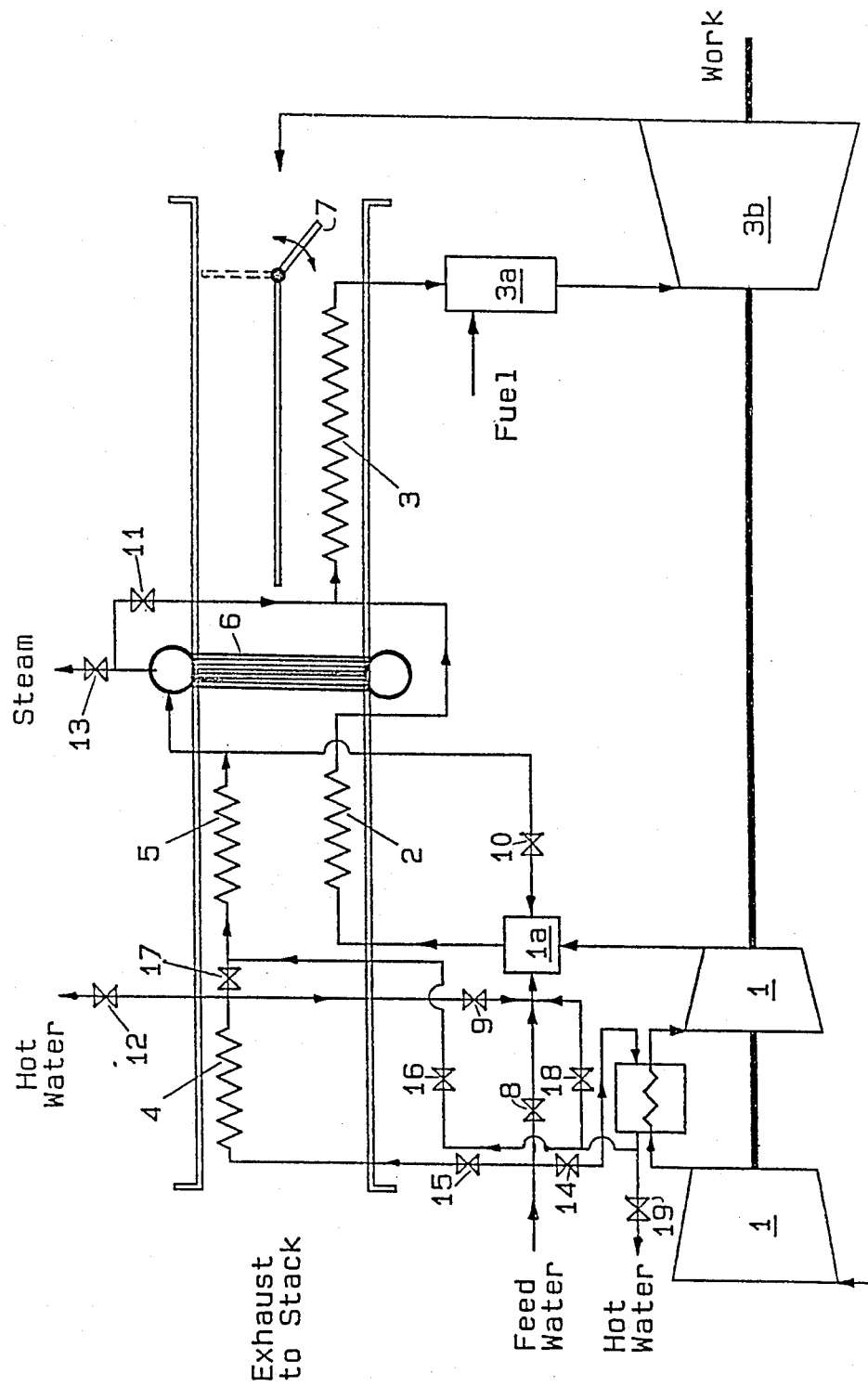

FIGS. 3a through 3d present overall performance maps calculated for this cycle and compared to four types of cycle in current practice or currently undergoing development. The ordinate in these figures is gross cycle efficiency, the percentage of fuel lower heating value heat-input converted to cycle work-output. The abcissa on these plots is the gross cycle specific power per unit compressor inlet airflow. The term "gross" in the present context implies work output before accounting for mechanical friction, auxillary power requirements or electric losses. The calculations for all cycles in these figures are based upon identical turbomachinery component assumptions. The effect of turbine cooling flows upon the cycle thermodynamics has been computed and included for all cycles based upon identical cooling technology assumptions. The set of common assumptions used is representative of current industrial gas-turbine engines. In the calculations presented, the minimum "pinch-point" temperature difference allowed was 25° F., the minimum stack temperature allowed was 200° F., and the temperature difference between exhaust gases at [4] and motive fluid at [2] was 75° F. In the calculations whose results are presented for this cycle in FIG. 3a it was assumed that all the aftercooler water was extracted through valve 9 and that valves 8 and 10 were shut. It was also assumed that the aftercooler water injection rate was such as to result in 95% relative humidity of the motive fluid at its exit, state [2B]. In the calculations presented for this cycle with evaporative intercooling (FIG. 1b) on FIG. 3b it was assumed that intercooler and aftercooler both saturate the air to 80% relative humidity at their outlet and that valves 8, 10, 14 and 16 on FIG. 1b were shut. For the results with surface intercooling shown in FIG. 3c for this cycle of FIG. 1c, the intercooler was assumed 80% effective. Priority was given to utilizing all the intercooler hot water first in the HTE 5 through the valve 16 then to the aftercooler 1a through valve 18. If this was insufficient, the makeup water to the heat engine cycle was drawn first through the valve 9 to the aftercooler 1a, then through a valve 17 to the HTE 5. Valves 8 and 10 were shut. Those arrangements were found most satisfactory for benchmark cases but the water valve settings need to be varied for any particular set of cycle parameters in order to achieve maximum efficiency, maximum specific power, or an optimum combination of efficiency, specific power and cogenerated hot water or steam.

Figure 3A:
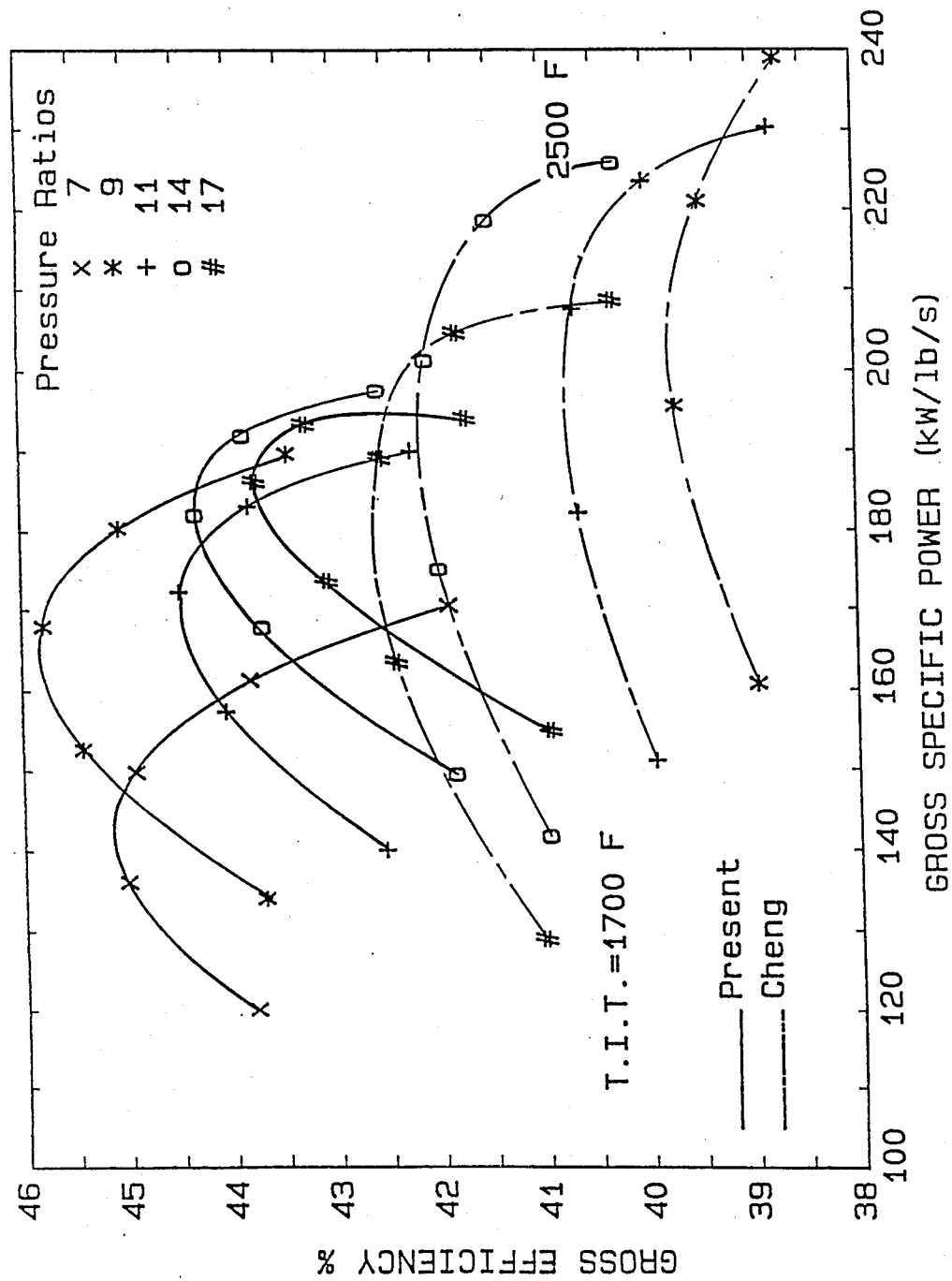
FIGS. 3a, 3b, 3c, and 3d are performance-map comparisons between the cycle of the present invention and four other cycles in current practice.
Figure 3B:
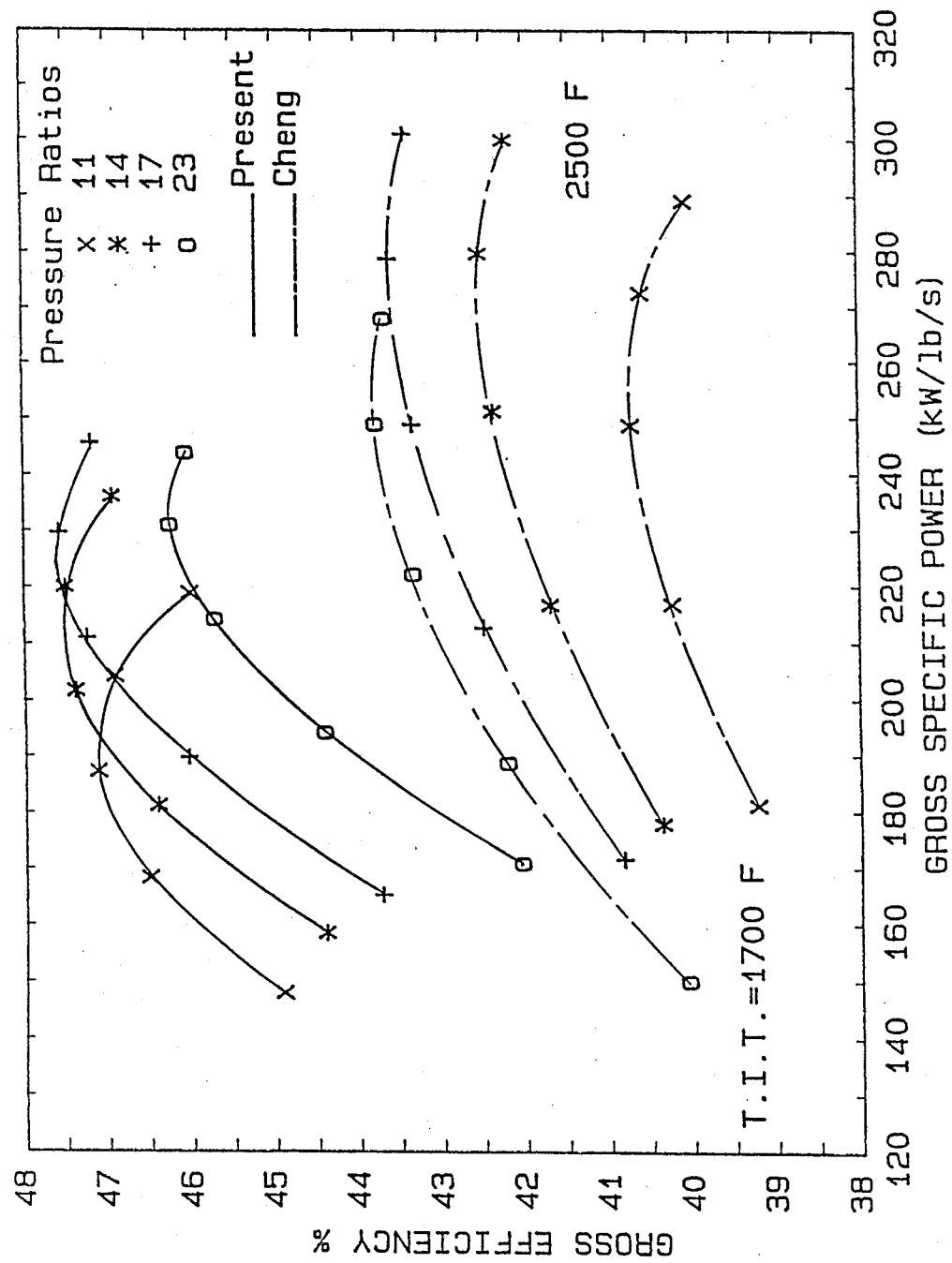
Figure 3C:
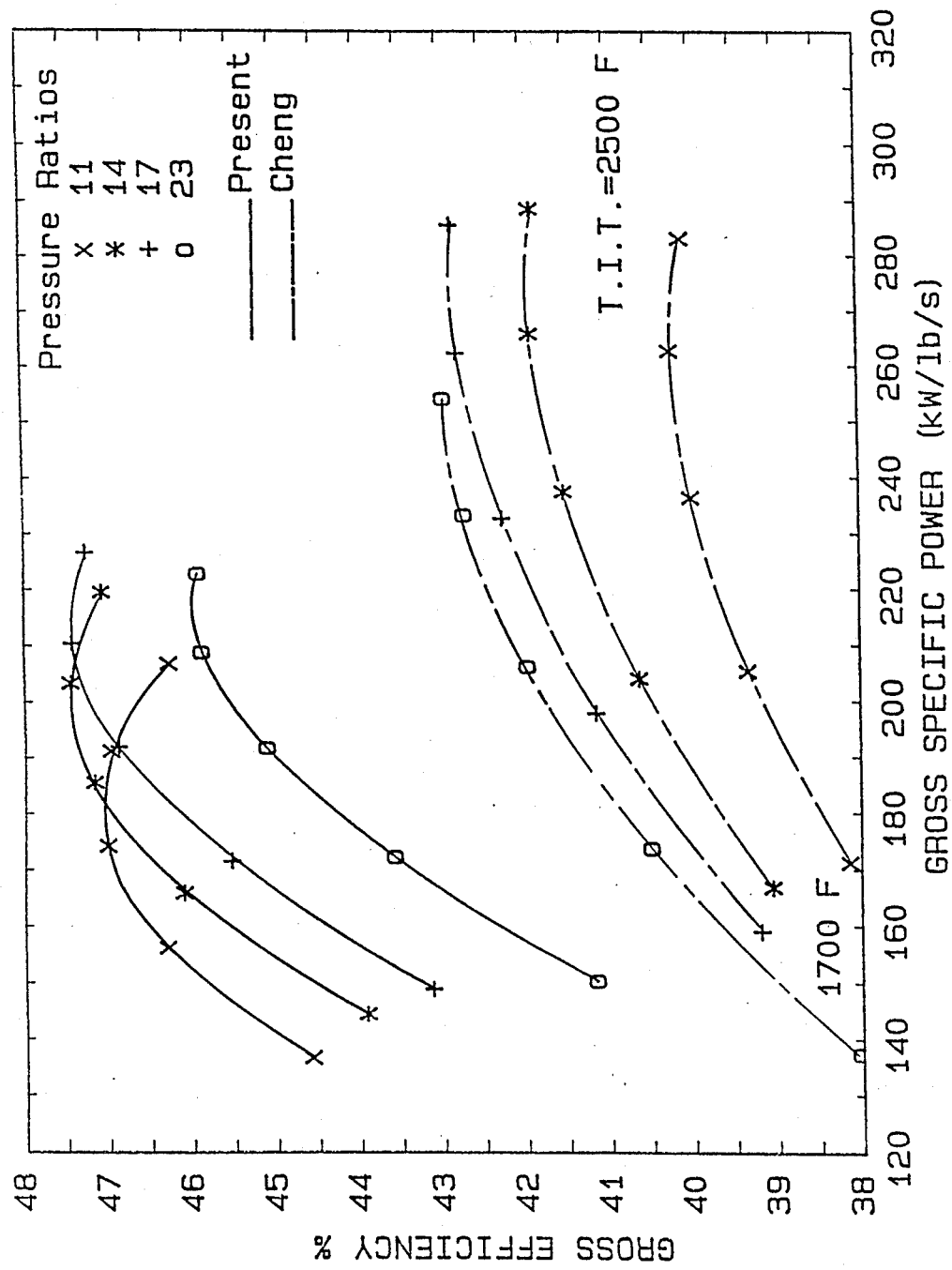

The Cheng cycle and the present cycle both use waste heat to raise steam which augments the combustor and turbine mass flow rates without increasing the compression work. A comparison is therefore in order. FIG. 3a shows the present cycle to offer much higher thermal efficiencies, particularly at lower pressure ratios where the specific power is somewhat lower than that for the Cheng cycle. At higher pressure ratios the efficiency advantage of the present cycle over Cheng's diminishes but can be regained by intercooling as shown in FIGS. 3b and 3c. FIGS. 4 through 8 together with the following discussion will elucidate the reasons.

Figure 4:
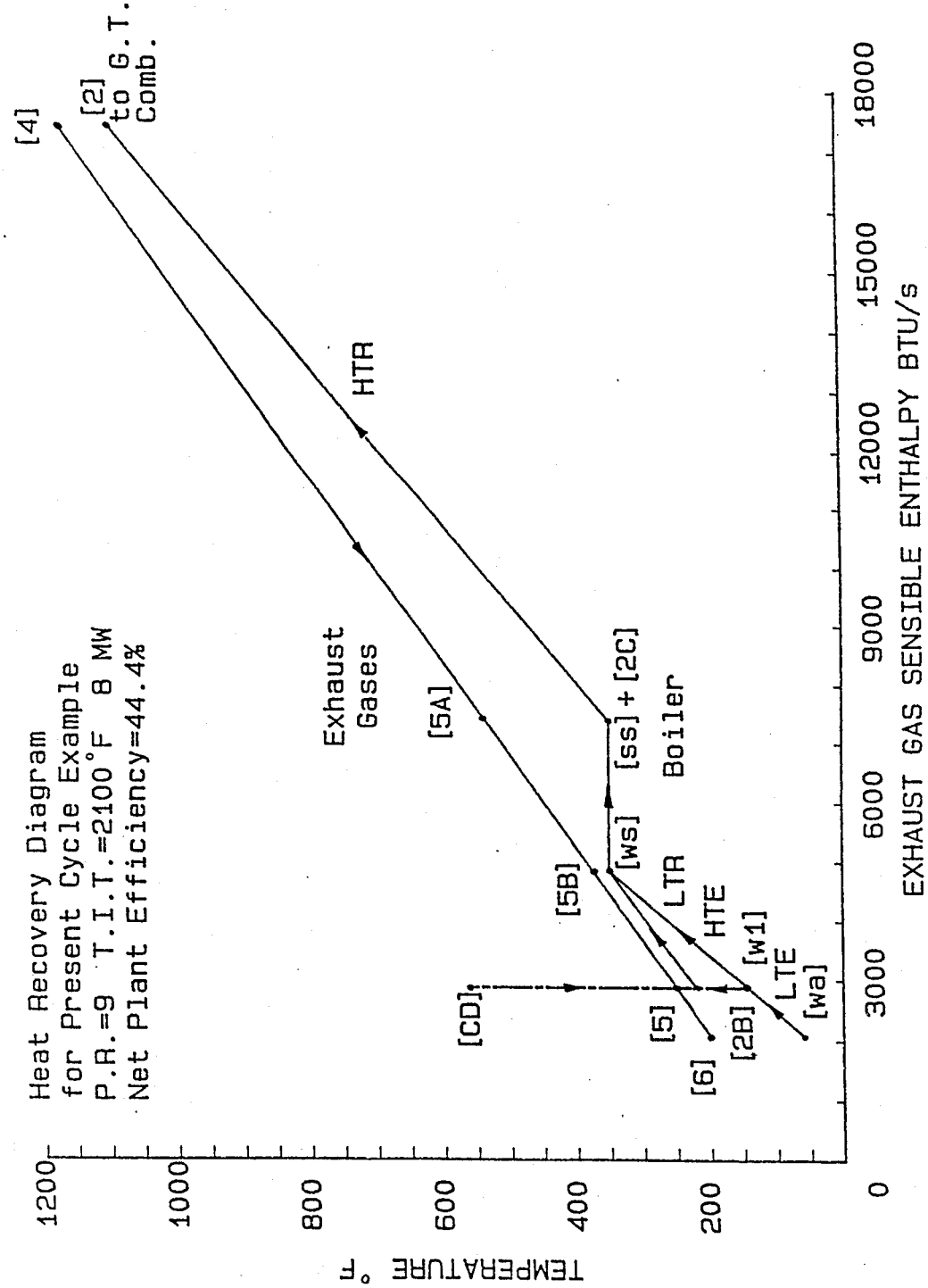
FIG. 4 is a diagram of temperature profiles along the exhaust heat recovery system for a typical example of the present cycle.
Figure 5:
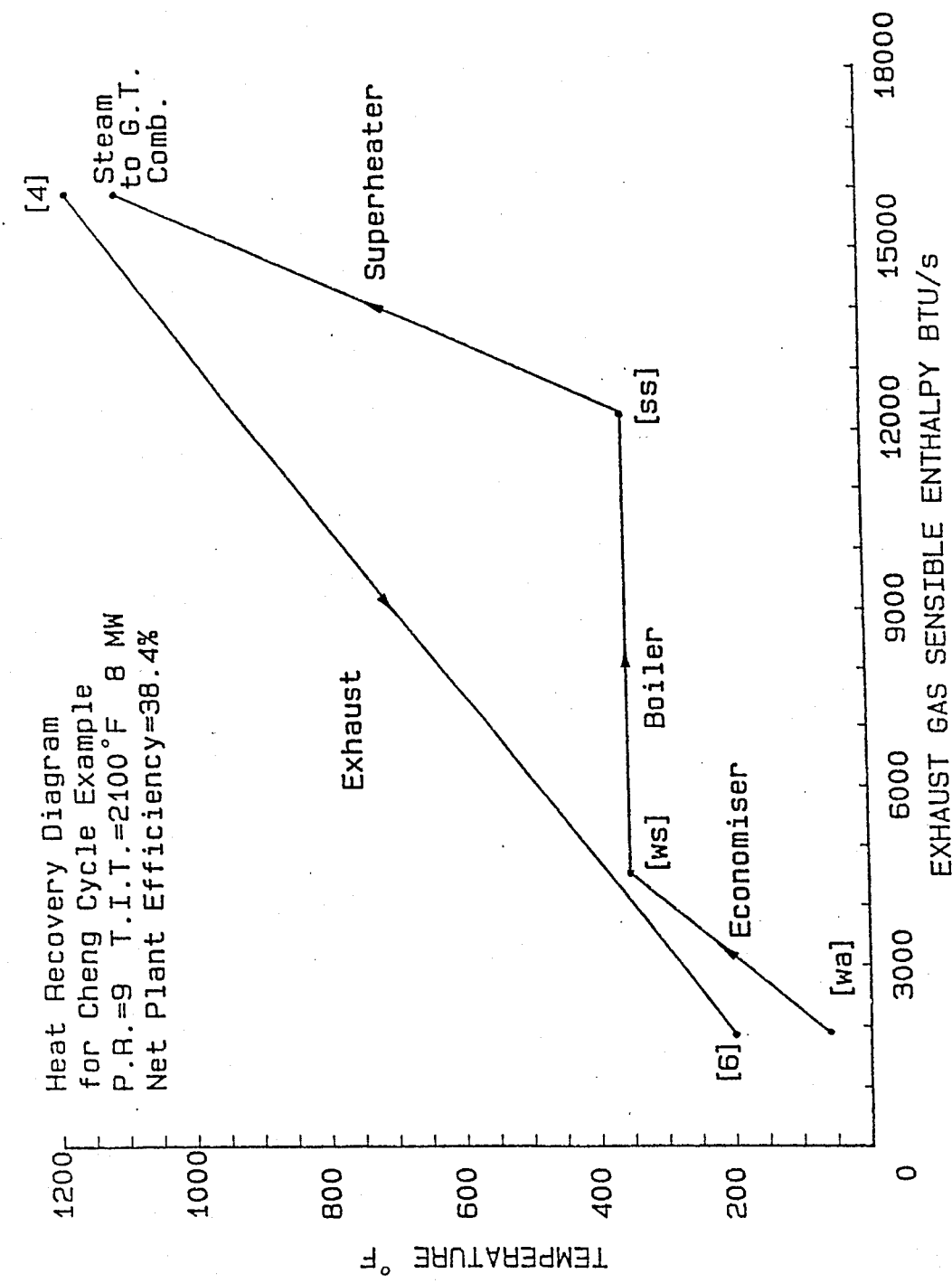
FIG. 5 is a diagram of temperature profiles along the exhaust heat recovery system for a typical Cheng cycle of the same power and engine technology as for the example of FIG. 4.

FIGS. 4 and 5 show the heat-recovery system temperature profile and key characteristics for two 8 MW non-intercooled systems with a pressure ratio of 9 and a turbine inlet temperature (TIT) of 2100° F. FIG. 4 is for the present system and FIG. 5 for the Cheng cycle. The temperature profiles for the exhaust gas cooling [4]-[5A]-[5B]-[5]-[6] and the composite (air/water/steam) motive fluid heating from states [wa] and [2B] to state [2] on FIG. 4 are in closer proximity than the profiles for heating water/steam only on FIG. 5. Thus, the irreversibility of the heat transfer process in the present system is lower than that in a Cheng cycle. Also *all* the motive fluid entering the combustor in the present cycle has been heated to state [2]. In the Cheng cycle, steam *only* has been heated to state [2] whereas the compressed air has not. Thus, the present cycle also has a lower combustion irreversibility. From a simple energy balance viewpoint, one may note that for both cases, the stack gas is at the minimum allowable limit of 200° F. In the present cycle, the sensible enthalpy of the exhaust gases between turbine exit and stack is used to *simultaneously and in-parallel* heat both air and water/steam. Thus, a smaller amount of water is boiled than in the Cheng cycle where that heat is used only to heat water/steam. Thus, the latent heat exhausted at the stack in the present cycle is lower than that for the Cheng cycle.

The smaller mean temperature differences between the exhaust gases and the motive fluid necessitate larger heat recovery surfaces for the present system as indicated on the figures by the product (UA) where U indicates the overall heat transfer coefficient and A the heat transfer surface area. In the examples of FIGS. 4 and 5 the present system requires a value of (UA) 87% larger than for a Cheng cycle while providing 6.3 additional percentage points in efficiency, corresponding to 13.75% reduction in specific fuel consumption. Economic optimization of that example may lead to elimination of the LTR 2 since it operates at a very low temperature difference. Calculations have shown that adjusting the aftercooler water-injection rate to result in motive fluid leaving the aftercooler at the boiler saturation temperature, thereby eliminating the LTR 2 and causing points [2B] and [2C] to coincide on FIG. 2 results in a cycle of 44.84% gross efficiency requiring total heat transfer surfaces with a value of (UA) of 134 BTU/s/F for the 8 MW plant. The loss of less than one point in efficiency may be more than counterbalanced by the 28% saving in (UA), and the cycle is still 5.35 points more efficient than the Cheng cycle and requires just 35% greater (UA). Thus, cycle designs without a low temperature recuperator may be economically most attractive under certain circumstances. At very low pressure ratios it may also prove economical to eliminate the evaporative aftercooler, however this is not likely to be the case for the example just given above where its elimination results in efficiency falling to 41.6%.

Figure 6A:
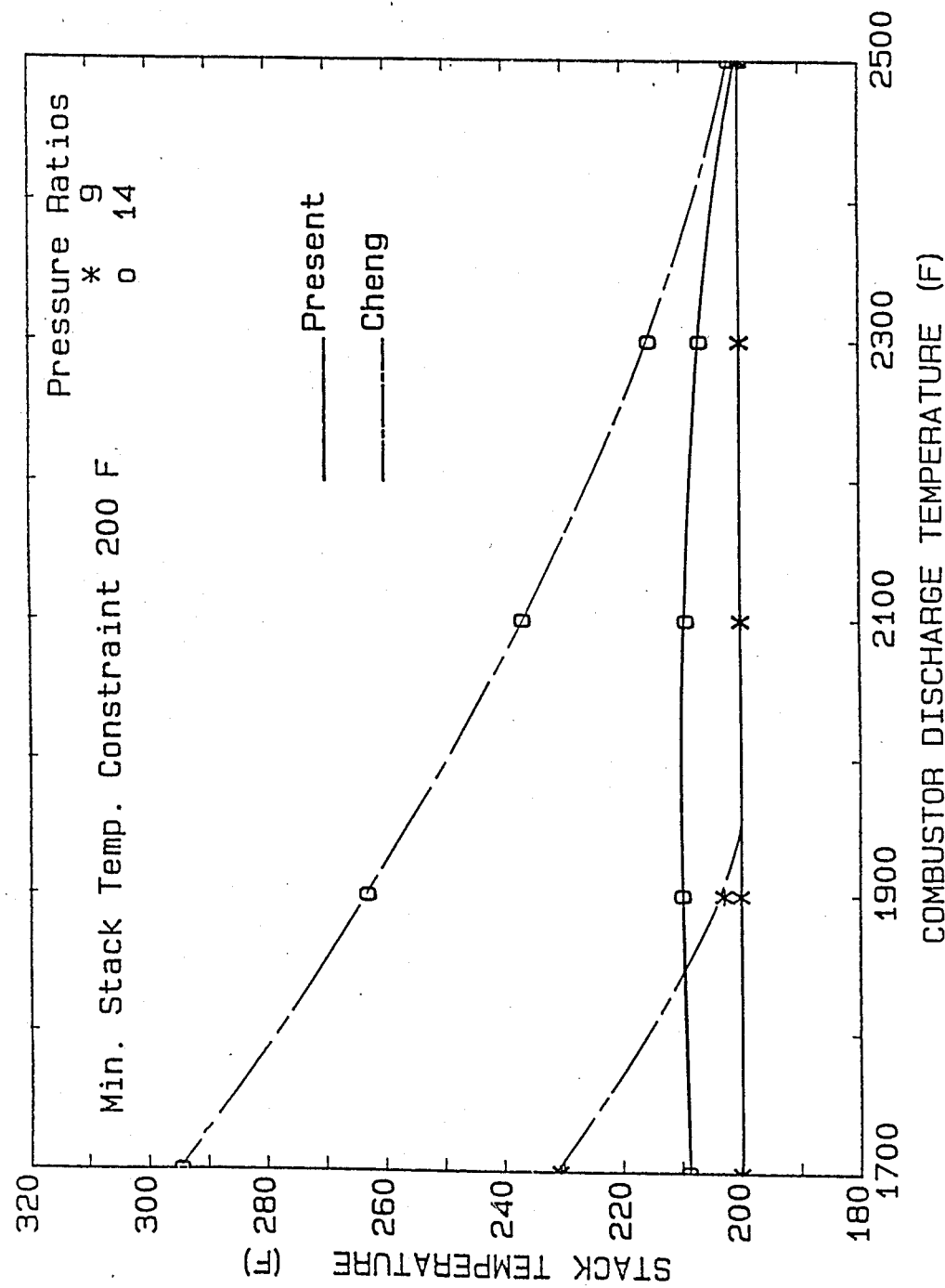
Figure 6B:
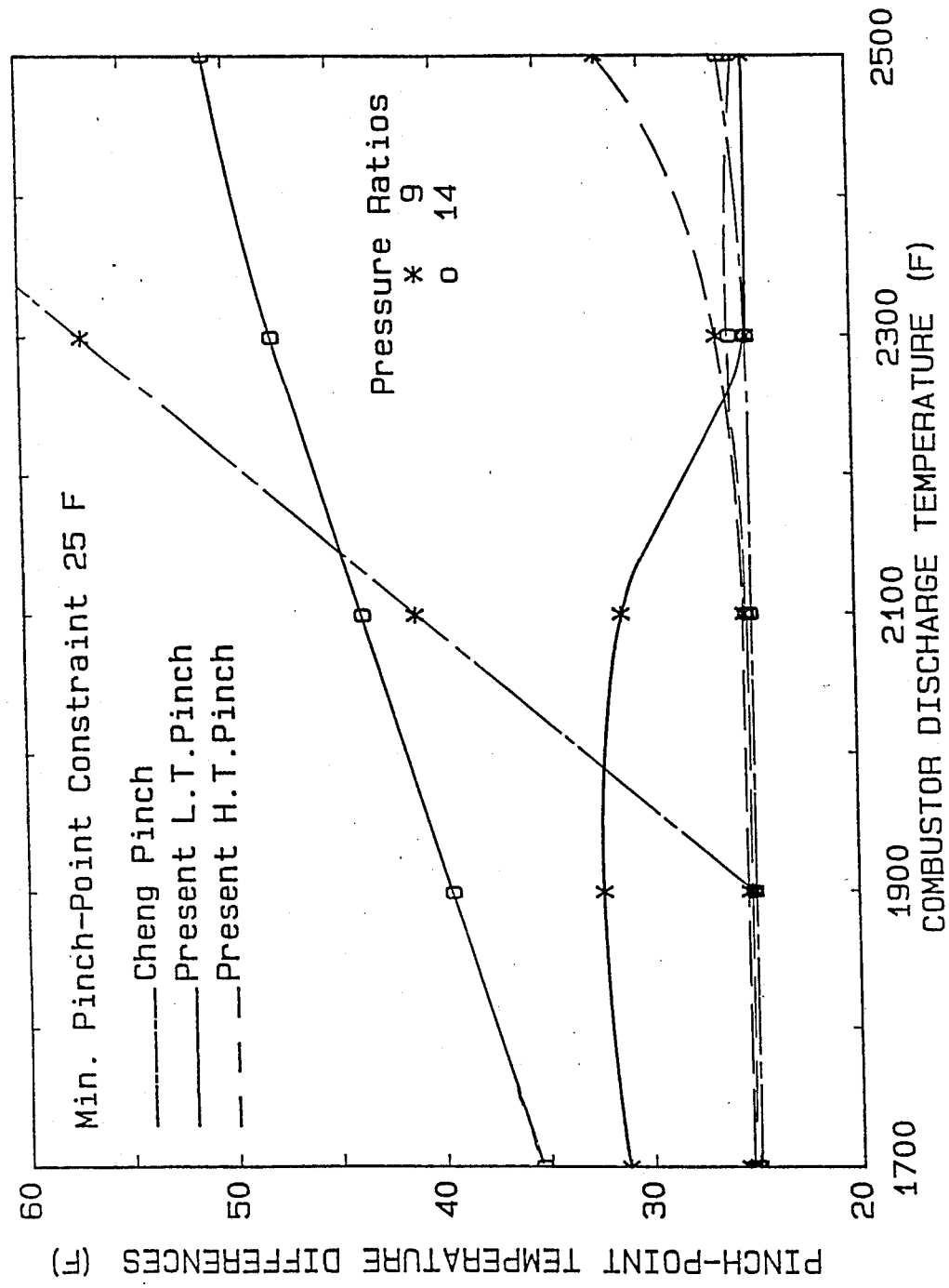

FIGS. 6a and 6b illustrate another reason for the superiority of this parallel, simultaneous, dual-mode heat recovery system over a single pressure boiler as used in the Cheng cycle examples. For given constraints on minimum stack temperature and minimum allowable pinch-point temperature difference, the present system is capable of operating closer to those constraints simultaneously over a wide range of system parameters, whereas a single pressure boiler can satisfy both constraints only at one value of the exhaust temperature for each pressure. A single pressure boiler operates at the stack constraint at low pressures and/or high exhaust gas temperatures, at which conditions the pinch-point temperature difference is greater than its minimum allowable value. At high boiler pressures and/or low exhaust temperatures, a single pressure boiler operates at the pinch-point constraint and the stack temperature is greater than its minimum allowable value. The flexibility of the present dual-mode system enables both constraints to be met and allows the designer to "tailor" the composite heat-recovery diagram, such as the one of FIG. 4 in order to find the optimum tradeoff between heat transfer surface cost and maximum work-conversion efficiency by selecting different aftercooler water injection flow rates from either or all of valves 8, 9, and 10 on FIG. 1a.

Figure 7:
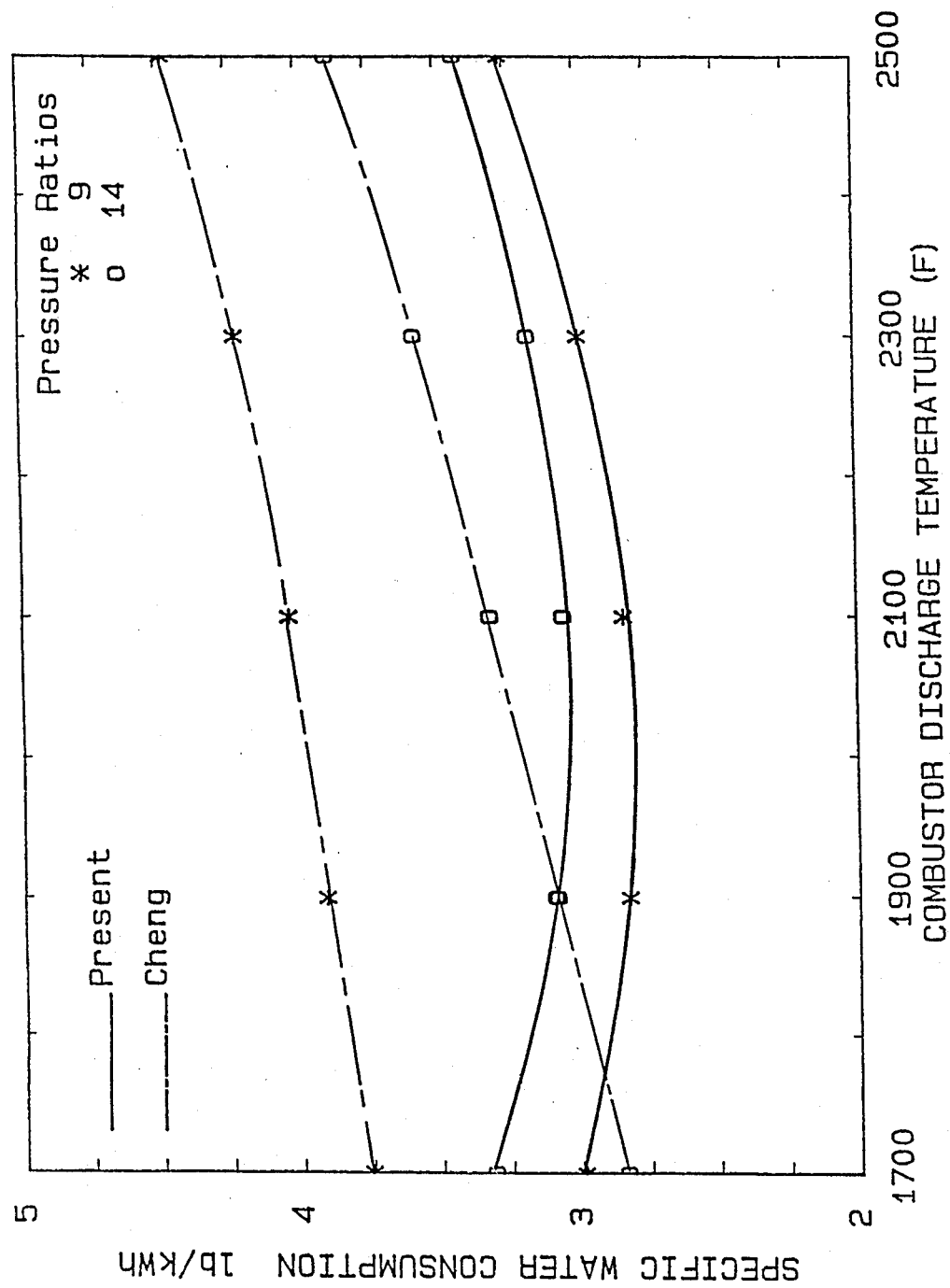
FIG. 7 is a graph comparing the water consumption per unit power output of the present cycle examples of FIG. 6 to that for the Cheng cycle examples of FIG. 6.

FIG. 7 compares the total water flow rate required per unit output power for the examples of the present cycle and Cheng's. It shows that at lower pressure ratios and higher TIT the superior efficiency and lower specific power of the present system seen on FIG. 3a derive from lower water flow rates and lower stack latent heat losses as discussed earlier. At higher pressure ratios and lower TIT, however, the superior efficiency and specific power seen on FIG. 3a for some examples of my cycle derive from increased water flow rates in comparison with the corresponding Cheng cycles. This is made possible by circumvention of the pinch-point constraint of the single pressure boiler by evaporating a portion of the water in the aftercooler at its partial pressure and therefore at a temperature below the saturation temperature at the boiler pressure. Whereas this increases the stack latent heat loss due to the greater water evaporation rate, the stack sensible heat loss is reduced due to the lower stack temperatures as seen in FIG. 6a. Under such conditions the present arrangement serves to increase the evaporation rate and lower the stack temperature beyond that possible in a single pressure boiler by utilizing the partial pressure evaporation to effectively act as a multi-pressure boiler system while still allowing the portion of the water evaporated at partial pressures below the turbine inlet pressure to flow with the composite motive fluid across the entire turbine pressure ratio.

The only example on FIG. 3a where the present cycle has a lower efficiency (but higher specific power) than the corresponding Cheng cycle is the one for a pressure ratio of 17 and TIT of 1700° F. At those conditions the compressor discharge stream [CD] is at a higher temperature than turbine exhaust [4] and therefore no portion of the heat recovered goes to heat the air portion of the motive fluid beyond partially restoring its temperature drop through the aftercooler. Thus, no recuperative efficiency improvement is observed and the temperature of the composite motive fluid entering the combustor at [2] is lower than that for a Cheng cycle. Therefore, for cycles where the turbine exit state [4] is at a lower temperature than the compressor discharge [CD], the present cycle is likely to have inferior efficiency when compared to the Cheng cycle due to the greater combustion irreversibility and higher pressure drops in the recuperators, unless the increased evaporation rate and lower stack sensible heat loss can counteract those effects. For high pressure ratio cycles with compressor intercooling, however, FIGS. 3b and 3c show the present cycle to provide considerable efficiency advantages over a Cheng cycle due to the increased difference between turbine exhaust temperature and compressor discharge temperature.

Figure 8:
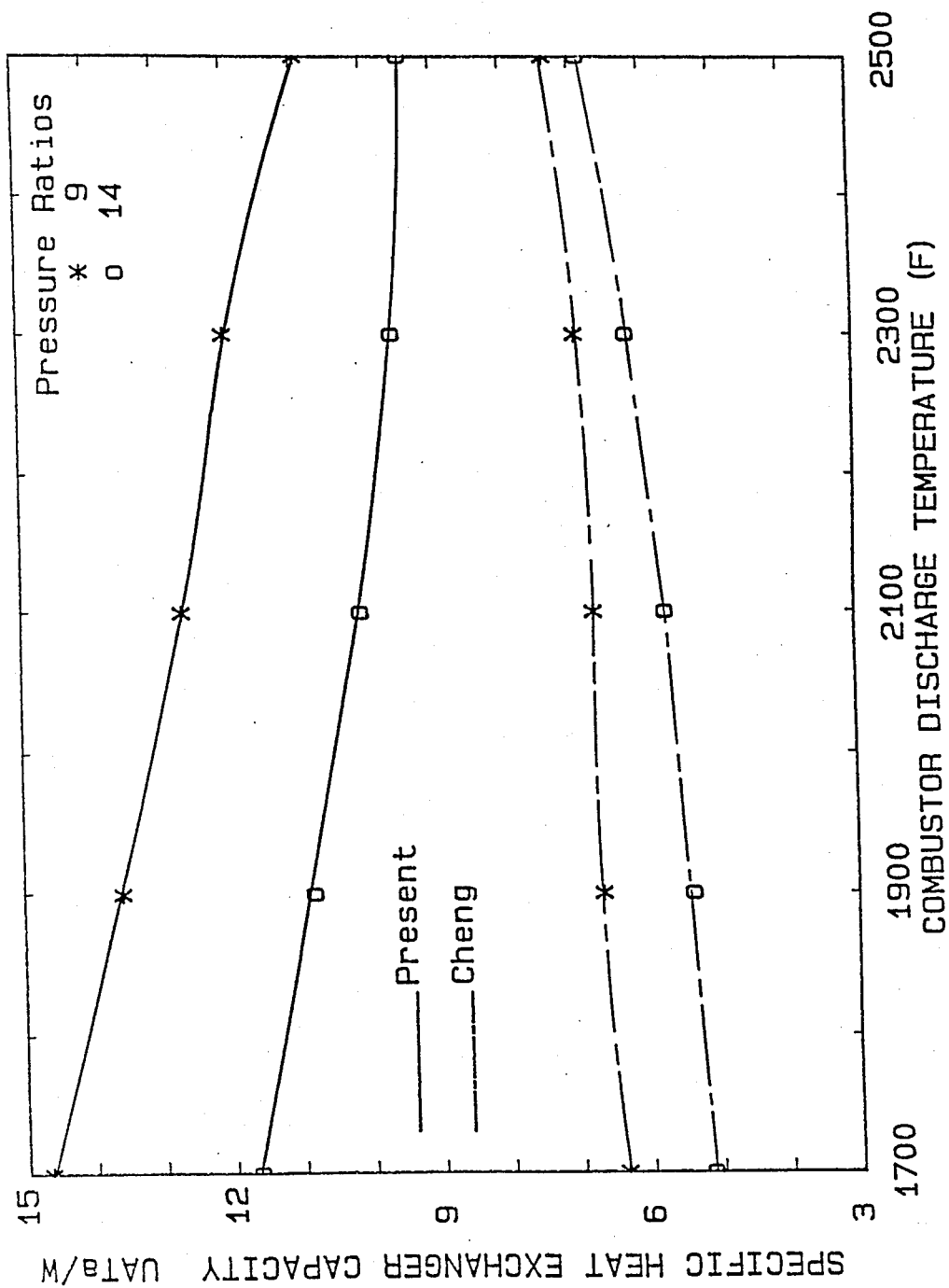
FIG. 8 is a graph comparing the total required heat-exchanger capacity per unit power output for the present cycle examples of FIG. 6 to that for the Cheng cycle examples of FIG. 6.

FIG. 8 shows a dimensionless measure of the required heat transfer capacity per unit power output, (UA)-Ta/W, where Ta denotes reference ambient temperature of 518.7 degrees Rankine and W the net cycle power output. This quantity is plotted against TIT for the cycle examples of FIG. 6. It shows that as the efficiency advantage of the present cycle over the Cheng cycle diminishes, the additional heat transfer surface required is also reduced.

Figure 3D:
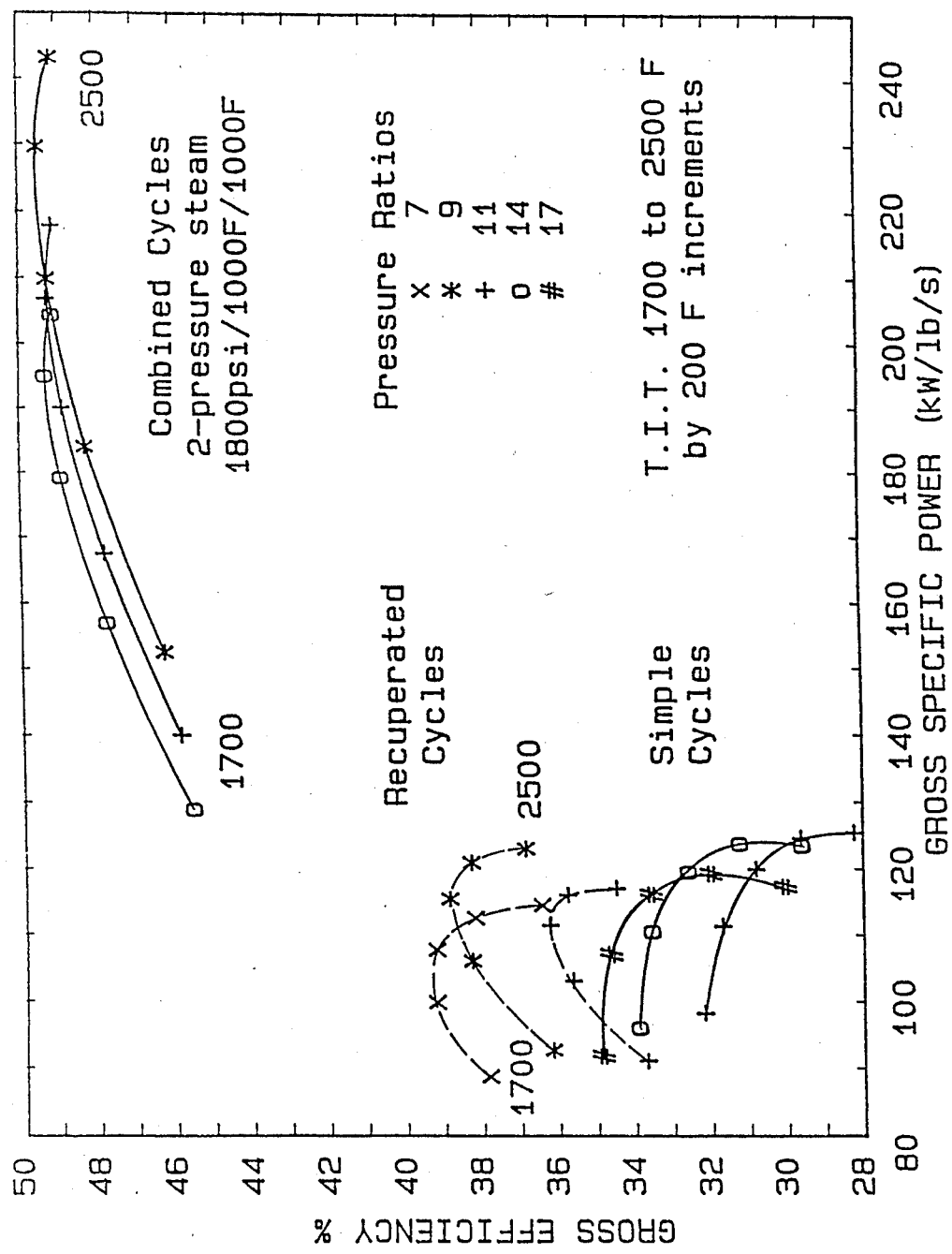

It is instructive to compare the performance of this cycle with the three types of cycle whose performance is shown on FIG. 3d based upon identical turbine technology assumptions. Comparing the performance of the non-intercooled examples of this cycle shown on FIG. 3a with the recuperated cycles of FIG. 3d, one sees advantages of the order of six percentage points in efficiency and 30% in specific power. Those accrue from the greater effectiveness of this heat recovery system, which requires a little over twice the specific heat exchanger capacity (UATa/W) when compared to the recuperated cycle. The additional efficiency and specific power are likely to make the additional investment in the heat recovery system well justified. Compared to a combined cycle, the intercooled examples of this cycle shown in FIGS. 3b and 3c are about 1.5 points in efficiency below the best dual-pressure-boiler combined cycles and have approximately the same specific power. They would have essentially the same efficiency as single-pressure-boiler combined cycles. The most efficient examples of this intercooled cycle shown on FIGS. 3b and 3c have specific water consumption rates of about 0.5 lb/s/MW (surface intercooled) and 0.75 lb/s/MW (evaporatively intercooled) and specific heat exchanger capacities (UATa/W) of about 7 for the total exhaust heat recovery system. Those indices are both superior to the examples of the non-intercooled cycle and are likely to justify the greater complexity in many plants. The savings in cost over a combined cycle, which has additional rotating machinery and heat exchangers is likely to favour my cycle, particularly in smaller cogeneration applications.

The present cycle allows flexible and efficient integration into a cogeneration plant as seen from the following operating regimes:

1. For maximum work conversion efficiency and no steam load, damper 7 is set in the dotted position shown in FIGS. 1a, 1b and 1c resulting in the performance characteristics discussed above.

2. For light steam loads, up to the steam flow rate raised at the maximum efficiency condition 1 above, damper 7 remains in the dotted position of FIG. 1a and the steam bleed valve is opened while valve 11 is closed. The recuperative effect on preheating the air prior to the combustor maintains a high work conversion efficiency.

3. For maximum work output, albeit at reduced efficiency, and with no steam load, damper 7 is set to completely by-pass the HTR, thereby increasing the steam flow rate which may be injected into the gas turbine for increased power.

4. For maximum steam loads, albeit at reduced work output and work conversion efficiency, damper 7 is set to completely by-pass the HTR, thereby increasing the steam flow rate, all of which is bled to process and valve 11 is shut.

5. At any steam load between zero and that of Mode 4 above, one has a flexible tradeoff between work output and work conversion efficiency which may be controlled by the position of damper 7. By-passing more exhaust gas around the HTR results in increased steam injection but decreased recuperation, giving more power but less efficiency, and vice versa.

Figure 9:
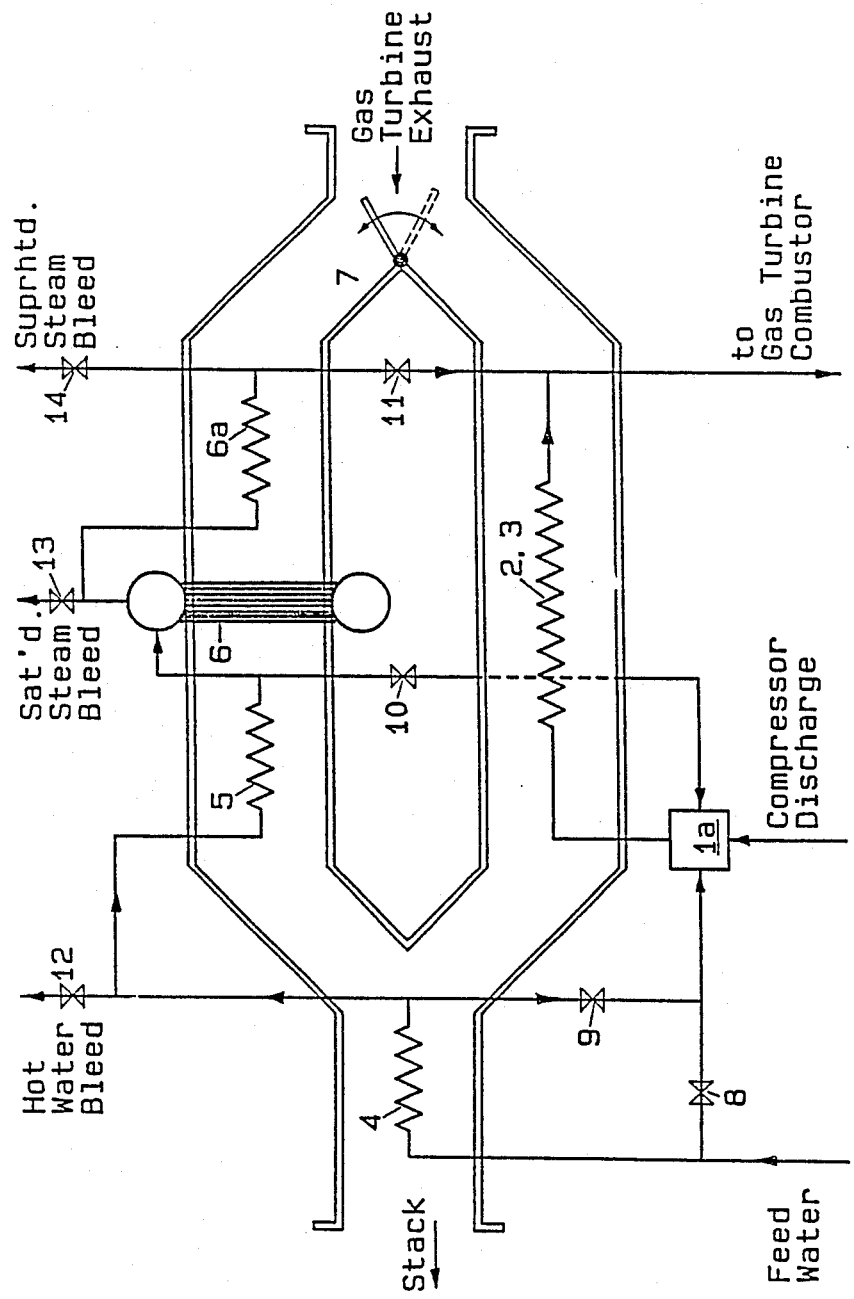
FIG. 9 is a schematic diagram of an alternate arrangement of the heat-recovery system of the present invention including a steam superheater.

The present system thus allows additional degrees of freedom for variable load cogeneration applications over most existing gas turbine cogeneration plants. In cogeneration applications where superheated steam is required, a separate superheater 3a may be used in-parallel with the HTR such as shown in the variation of FIG. 9.

Other variations and arrangements of gas turbine cycles embodying my principle of simultaneous, parallel, dual-mode heat recovery will become obvious to those skilled in the art, and it is intended to claim all those which fall within the scope of this invention.

What is claimed is:

1. Dual mode heat recovery system disposed in heat exchange relation with exhaust gases from a gas turbine plant comprising:
   a boiler fed from a feedwater supply means, the boiler and feedwater supply means both in heat exchange relation with the exhaust gases in a boiler/feedwater supply path;
   recuperator means for conveying motive fluid in counterflow heat exchange relation with the exhaust gases in a recuperator path;
   means for mixing boiler output with the motive fluid before combustion;
   the boiler/feedwater supply means and the recuperator means comprising parallel and separate flow paths within the exhaust gas flow; and
   flow control means for apportioning the exhaust gas flow between the boiler/feedwater supply path and the recuperator path.

2. The heat recovery system of claim 1 further including an evaporative aftercooler for cooling and increasing the mass flow rate of the motive fluid before entering the recuperator means.

3. The heat recovery system of claim 1 or claim 2 wherein the recuperator means includes a first, low temperature recuperator disposed downstream of the boiler with respect to exhaust gas flow and a second, high temperature recuperator disposed upstream of the boiler with respect to the exhaust gas flow.

4. The system of claim 1 or claim 2 or claim 3 further including a compressor having intercooling apparatus.

5. The apparatus of claim 4 wherein the intercooling apparatus is an evaporative intercooler.

6. The apparatus of claim 4 wherein the intercooling apparatus is a surface intercooler.

7. Gas-turbine power-plant cycle comprising:
   compressor means to compress motive fluid;
   evaporative aftercooler means connected to the compressor adapted to introduce liquid water to cool the motive fluid by evaporation and augment its mass flow rate;
   first recuperator means for receiving the motive fluid from the aftercooler and conveying the motive fluid in counterflowing heat exchange relationship with gas turbine exhaust gases to heat the motive fluid to close to water saturation temperature at its pressure;
   first and second economizer means to convey liquid feedwater in counterflowing heat exchange relationship with the exhaust gases, the first economizer means adapted to heat the liquid feedwater to a temperature below that of the motive fluid leaving the aftercooler means, the first economizer means located after the exhaust gases have flowed through both the first recuperator means and the second economizer means;
   the second economizer means adapted to heat liquid water discharged from the first economizer means to a temperature close to saturation temperature of water at the pressure of the compressed motive fluid by causing it to flow in counterflow heat exchange relationship with the exhaust gases between the same temperature levels as those flowing in heat exchange relationship with the motive fluid in the first recuperator;
   boiler means adapted to boil liquid water from the second economizer means by causing the water to flow in heat exchange relationship with the exhaust gases before said gases have transferred heat to the first recuperator means and economizer means;
   means to convey and introduce an adjustable portion of the steam raised in the boiler into the stream of motive fluid leaving the first recuperator means;
   second recuperator means for receiving the motive fluid/steam mixture and for heating the mixture by passing it in counterflow heat exchange relationship with exhaust gases before the gases have been used to effect heat transfer to the boiler means;
   combustor means for receiving the heated mixture of motive fluid to raise the temperature of the motive fluid; turbine means for receiving the motive fluid from the combustor to expand the motive fluid and extract work therefrom; and
   flow control means for receiving expanded motive fluid from the turbine and to adjustably apportion the motive fluid discharged from the turbine means into parallel streams; means to convey one stream directly to the boiler means; means to convey the other stream to the recuperator means.

8. A gas-turbine power-plant cycle comprising:
   compressor means to compress motive fluid;
   means to convey the compressed motive fluid to evaporative aftercooler means;

means to introduce liquid water into said evaporative aftercooler means where it is mixed with the compressed motive fluid to cool it by evaporation to a temperature close to the saturation temperature of water at the pressure of the motive fluid and to augment its mass flow rate;

means to convey the resulting motive fluid to recuperator means;

economiser means to heat liquid feedwater to a temperature close to saturation temperature of water at the pressure of the compressed motive fluid by causing it to flow in counterflowing heat exchange relationship with exhaust gases from the turbine;

boiler means to boil liquid water which has already been heated in the economiser means by causing it to flow in heat exchange relationship with the turbine exhaust gases, before said gases have been used to effect heat transfer in the economiser means;

means to convey and introduce an adjustable portion of the steam raised in the boiler means into the stream of motive fluid leaving the aftercooler means; means to convey the resulting mixture of motive fluid to recuperator means for heating the motive fluid mixture by passing it in counterflow heat exchange relationship with the turbine exhaust gases, before said gases have been used to effect heat transfer to the boiler means;

means to convey the heated mixture of motive fluid to combustor means to raise the temperature of said motive fluid; means to convey said motive fluid to turbine means to expand said motive fluid and extract work therefrom; means to convey the expanded motive fluid to flow control means; and flow control means to adjustably apportion the expanded motive fluid discharged from the turbine means into two streams; means to convey one stream directly to the boiler means; means to convey the other stream to the recuperator means.

9. A gas-turbine power-plant cycle comprising:

compressor means to compress motive fluid, typically ambient air;

means to convey the compressed motive fluid to evaporative aftercooler means;

means to introduce liquid water into said evaporative aftercooler mean where it is mixed with the compressed motive fluid to cool it by evaporation and augment its mass flow rate;

means for convey the resulting motive fluid to recuperator means where the motive fluid is heated to close to water saturation temperature at its pressure by causing it to flow in counterflowing heat-exchange relationship with exhaust gases from the gas-turbine; a portion of the energy of said exhaust gases between the same temperature levels being used simultaneously and in parallel to heat liquid water flowing in counterflow heat-exchange relationship within a first economiser means to heat liquid feedwater to a temperature below that of the motive fluid leaving aftercooler means by causing it to flow in counterflowing heat exchange relationship with the turbine exhaust gases after said exhaust gases have flowed through both recuperator means and first economiser means;

second economiser means to heat liquid water discharged from the first economiser means to a temperature close to saturation temperature of water at the pressure of the compressed motive fluid by causing it to flow in counterflowing heat exchange relationship with turbine exhaust gases between the same temperature levels as those flowing in heat exchange relationship with the motive fluid in the recuperator means;

boiler means to boil liquid water which has already been heated in the first and second economiser means by causing it to flow in heat exchange relationship with the turbine exhaust gases, before said gases have been used to effect simultaneous heat transfer in recuperator means and economiser means; means to convey and introduce steam raised in boiler means into superheater means in which steam is superheated by causing it to flow in counterflowing heat exchange relationship with a portion of the turbine exhaust gases before said gases have been used to effect heat transfer to boiler means, this portion being controlled by flow-control means, the remaining portion of said gases being used to effect heat transfer to motive fluid in recuperator means, said heat transfer being effected simultaneously and in parallel between the same approximate temperature levels of said gases;

recuperator means for heating the motive fluid by passing it in counterflow heat exchange relationship with the portion of turbine exhaust gases not used to effect heat transfer to superheater means and before said gases have been used to effect heat transfer to boiler means;

means to convey the heated motive fluid leaving recuperator means as well as steam leaving superheater means to combustor means to raise the temperature of the mixed motive fluid; means to convey said motive fluid to turbine means to expand said motive fluid and extract work therefrom; means to convey the exhausted motive fluid to flow control means to adjustably apportion the motive fluid discharged from the turbine means into two streams; means to convey one stream to superheater means; means to convey the other stream to recuperator means.

10. A gas-turbine power-plant cycle comprising:

compressor means to compress motive fluid, typically ambient air;

economiser means to heat liquid feedwater to a temperature close to saturation temperature of water at the pressure of the compressed motive fluid by causing it to flow in counterflowing heat exchange relationship with the turbine exhaust gases;

boiler means to boil liquid water which has already been heated in the economiser means by causing it to flow in heat exchange relationship with exhaust gases, from the turbine before said gases have been used to effect heat transfer in the economiser means;

means to convey and introduce a variable portion of the steam raised in the boiler means into the compressed motive fluid leaving the compressor means; means to convey the resulting mixture of motive fluid to recuperator means for heating the motive fluid mixture by passing it in counterflow heat exchange relationship with a portion of the turbine exhaust gases, before said portion has been used to effect heat transfer to the boiler means;

means to convey the heated mixture of motive fluid to combustor means to raise the temperature of said motive fluid; means to convey said motive fluid to turbine means; to expand said motive fluid and extract work therefrom; means to convey the exhausted motive fluid to flow to adjustably apportion the exhaust motive fluid discharged from the turbine means into two streams; means to convey one stream directly to boiler means; means to convey the other stream to recuperator means.

11. A gas-turbine power-plant cycle comprising:

compressor means to compress motive fluid, typically ambient air;

means to convey the compressed motive fluid to recuperator means for heating the motive fluid by passing it in counterflow heat exchange relationship with a portion of exhaust gases from the turbine, the remaining portion of the turbine exhaust gases being utilized in parallel to effect heat transfer in a heat recovery steam generator means comprising economiser means to heat liquid feedwater to a temperature close to saturation temperature of water at the pressure of the compressed motive fluid, boiler means to boil liquid water heated in the economiser means and superheater means to superheat steam raised in the boiler means; the heat source for said heat recovery steam generator being the turbine exhaust gases below the temperature of said gases exiting the recuperator means and the portion of said gases not used to effect parallel heat transfer to the recuperator means above the temperature of said gases exiting the recuperator means;

means to convey the heated motive fluid leaving the recuperator means as well as steam leaving heat recovery steam generator means to combustor means to raise the temperature of the mixed motive fluid; means to convey said motive fluid to turbine means to expand said motive fluid and extract work therefrom; means to convey the expanded motive fluid to flow control means; and flow control means to adjustably apportion the expanded motive fluid discharged from the turbine means into two streams; means to convey one stream to heat recovery steam generator means; means to convey the other stream to recuperator means.

12. A gas-turbine power-plant cycle having the same arrangement as the cycles of claim 7, or 8, or 9, or 10, or 11 which also comprises means for intercooling the motive fluid during the process of its compression by the compressor means.

13. Gas-turbine power-plant cycle comprising:

compressor means to compress gaseous motive fluid, typically air;

evaporative aftercooler means connected to the compressor adapted to introduce liquid water into the compressed motive fluid to cool said fluid and to augment its mass flow rate;

recuperator means for receiving the motive fluid from the aftercooler and conveying said motive fluid in counterflow heat exchange relationship with a portion of the turbine exhaust gases to heat said motive fluid;

first and second economiser means to convey liquid feedwater in counterflow heat exchange relationship with the exhaust gases, the first economiser adapted to heat liquid feedwater to a temperature close to that of the compressed motive fluid leaving the aftercooler by utilizing exhaust gases which have already flowed through both the recuperator and the second economiser, said second economiser being adapted to heat liquid feedwater discharged from the first economiser to a temperature close to water saturation temperature at the pressure of the motive fluid by causing it to flow in counterflow heat exchange relationship with the portion of the exhaust gases not utilized to effect heat transfer in the recuperator;

boiler means adapted to boil liquid water from the second economiser by causing the water to flow in heat exchange relationship with the portion of the exhaust gases not utilized to effect heat transfer in the recuperator means, and before said portion of gases has transferred heat to the second economiser means;

superheater means adapted to receive steam from the boiler and to superheat said steam by conveying it in counterflow heat exchange relationship with the portion of the exhaust gases not utilized to effect heat transfer in the recuperator means, and before said portion of gases has transferred heat to the boiler means;

combustor means for receiving the compressed motive fluid from the recuperator as well as steam from the superheater and for heating the resulting composite motive fluid;

turbine means for receiving the motive fluid from the combustor to expand said motive fluid and extract work therefrom; and flow control means for receiving the exhausted gas motive fluid discharged from the turbine and to adjustably apportion said turbine exhaust gases into two parallel streams; means to convey one stream to the superheater means; means to convey the other stream to the recuperator means.

14. Gas-turbine power-plant cycle comprising:

compressor means to compress gaseous motive fluid, typically air;

economiser means adapted to heat liquid feedwater to a temperature close to its saturation temperature by conveying said feedwater in counterflow heat exchange relationship with the turbine exhaust gases;

boiler means adapted to boil liquid water from the economiser by causing the water to flow in heat exchange relationship with the exhaust gases before said gases have transferred heat to the economiser means;

superheater means adapted to heat steam from the boiler by conveying said steam in counterflow heat exchange relationship with the exhaust gases before said gases have transferred heat to the boiler;

means to convey and introduce an adjustable portion of the steam issuing from the superheater into the stream of motive fluid leaving the compressor;

recuperator means for receiving the motive fluid/steam mixture and for heating said mixture by conveying it in counterflow heat exchange relationship with exhaust gases before said gases have been used to effect heat transfer to the superheater means;

combustor means for receiving the heated mixture of motive fluid from the recuperator and for further raising the temperature of said motive fluid;

turbine means for receiving the motive fluid from the combustor to expand said motive fluid and extract work therefrom; and flow control means for receiving the exhausted gas motive fluid discharged from the turbine and to adjustably apportion said turbine exhaust gases into two parallel streams; means to convey one stream directly to the superheater means; means to convey the other steam to the recuperator means.

15. Gas-turbine power-plant cycle comprising:

compressor means to compress gaseous motive fluid, typically air;

economiser means adapted to heat liquid feedwater to a temperature close to its saturation temperature by conveying said feedwater in counterflow heat exchange relationship with the turbine exhaust gases;

boiler means adapted to boil liquid water from the economiser by causing the water to flow in heat exchange relationship with the exhaust gases before said gases have transferred heat to the economiser means;

first superheater means adapted to receive steam from the boiler and to superheat said steam by conveying it in counterflow heat exchange relationship with the turbine exhaust gases before said gases have been utilized to effect heat transfer to the boiler means;

second superheater means adapted to receive steam from the first superheater and to further superheat said steam by conveying it in counterflow heat exchange relationship with a portion of the turbine exhaust gases before said portion of gases have been utilized to effect heat transfer to the first superheater;

recuperator means adapted to receive compressed motive fluid from the compressor and to heat said fluid by conveying it in counterflow heat exchange relationship with the portion of the turbine exhaust gases not being used to effect heat transfer in the second superheater means, and before said gases have been utilized to effect heat transfer to the first superheater means;

combustor means for receiving the compressed motive fluid from the recuperator as well as steam from the second superheater and for heating the resulting composite motive fluid;

turbine means for receiving the motive fluid from the combustor to expand said motive fluid and extract work therefrom; and flow control means for receiving the exhausted gas motive fluid discharged from the turbine and to adjustably apportion said turbine exhaust gases into two parallel streams; means to convey one stream to the second superheater means; means to convey the other stream to the recuperator means.

16. Gas-turbine power-plant cycle comprising:

compressor means to compress gaseous motive fluid, typically air;

economiser means adapted to heat liquid feedwater to a temperature close to its saturation temperature by conveying said feedwater in counterflow heat exchange relationship with the turbine exhaust gases;

boiler means adapted to boil liquid water from the economiser by causing the water to flow in heat exchange relationship with the exhaust gases before said gases have transferred heat to the economiser means;

superheater means adapted to receive steam from the boiler and to superheat said steam by conveying it in counterflow heat exchange relationship with a portion of the turbine exhaust gaes before said gases have been utilized to effect heat transfer to the boiler means;

recuperator means adapted to receive compressed motive fluid from the compressor and to heat said fluid by conveying it in counterflow heat exchange relationship with a portion of the turbine exhaust gases, said portion of gases not being used to effect heat transfer to the superheater means and being subsequently utilized to effect heat transfer to the boiler means;

combustor means for receiving the compressed motive fluid from the recuperator as well as steam from the superheater and for heating the resulting composite motive fluid;

turbine means for receiving the motive fluid from the combustor to expand said motive fluid and extract work therefrom; and flow control means for receiving the exhausted gas motive fluid discharged from the turbine and to adjustably apportion said turbine exhaust gases into three parallel streams; means to convey the first stream to the superheater, means to convey the second stream to the recuperator and means to convey the third stream directly to the boiler.

17. Gas-turbine power-plant cycle comprising:

compressor means to compress gaseous motive fluid, typically air;

economiser means adapted to heat liquid feedwater to a temperature close to its saturation temperature by conveying said feedwater in counterflow heat exchange relationship with the turbine exhaust gases;

boiler means adapted to boil liquid water from the economiser by causing the water to flow in heat exchange relationship with the exhaust gases before said gases have transferred heat to the economiser means;

first superheater means adapted to receive steam from the boiler and to superheat said steam by conveying it in counterflow heat exchange relationship with the turbine exhaust gases before said gases have been utilized to effect heat transfer to the boiler means;

second superheater means adapted to receive steam from the first superheater and to further superheat said steam by conveying it in counterflow heat exchange relationship with a portion of the turbine exhaust gases before said portion of gases has been utilized to efect heat transfer to the first superheater;

recuperator means adapted to receive compressed motive fluid from the compressor and to heat said fluid by conveying it in counterflow heat exchange relationship with a portion of the turbine exhaust gases, said portion of gases not being used to effect heat transfer in the second superheater means and being subsequently utilized to effect heat transfer to the first superheater means;

combustor means for receiving the compressed motive fluid from the recuperator as well as steam from the second superheater and for heating the resulting composite motive fluid;

turbine means for receiving the motive fluid from the combustor to expand said motive fluid and extract work therefrom; and flow control means for receiving the exhausted gas motive fluid discharged from the turbine and to adjustably apportion said turbine exhaust gases into three parallel streams; means to conveyor the first stream to the second superheater, means to convey the second stream to the recuperator and means to convey the third stream directly to the first superheater.

18. The improved gas turbine cycle of claim 7 or claim 9 or claim 10 or claim 11 or claim 12 or claim 13 or claim 14 or claim 15 or claim 16 or claim 17 further incorporating means to allow an adjustable portion of the compressed motive fluid to by-pass the recuperator means and to by conveyed directly to the combustor means.

19. The improved gas turbine cycle of claim 7 or claim 9 or claim 10 or claim 11 or claim 12 or claim 13 or claim 14 or claim 15 or claim 16 or claim 17 or claim 18 further incorporating means to allow an adjustable portion of the steam raised in the boiler means to by-pass the superheater means and to be conveyed directly to the combustor means.

20. The improved gas turbine cycle of claim 7 or claim 9 or claim 10 or claim 11 or claim 12 or claim 13 or claim 14 or claim 15 or claim 16 or claim 17 further including apparatus for reheating the gaseous stream within the turbine or after said stream is discharged from the turbine.

* * * * *

UNITED STATES PATENT AND TRADEMARK OFFICE
CERTIFICATE OF CORRECTION

PATENT NO. : 4,753,068
DATED : June 28, 1988
INVENTOR(S) : Maher A. El-Masri

It is certified that error appears in the above-identified patent and that said Letters Patent are hereby corrected as shown below:

Column 11, line 2, after "flow", insert --control means--.

Column 13, line 25, change "have" to --has--.

Column 14, line 64, change "conveyor" to --convey--.

Column 15, line 6, change "by" to --be--.

Signed and Sealed this

Sixth Day of December, 1988

Attest:

DONALD J. QUIGG

*Attesting Officer*   *Commissioner of Patents and Trademarks*

UNITED STATES PATENT AND TRADEMARK OFFICE
CERTIFICATE OF CORRECTION

PATENT NO. : 4,753,068

DATED : June 28, 1988

INVENTOR(S) : Maher A. El-Masri

It is certified that error appears in the above-identified patent and that said Letters Patent is hereby corrected as shown below:

Column 9, line 46, change "mean" to --means--.

Column 9, line 49, change "for" to --to--.

Signed and Sealed this

Sixteenth Day of May, 1989

Attest:

DONALD J. QUIGG

Attesting Officer

Commissioner of Patents and Trademarks